United States Patent [19]

Sintim et al.

[11] Patent Number: 5,391,781
[45] Date of Patent: Feb. 21, 1995

[54] METHODS FOR DISPERSING SULFUR IN AQUEOUS SYSTEMS

[75] Inventors: Quincy K. A. Sintim, Houston; Paul V. Roling, Spring, both of Tex.

[73] Assignee: Betz Laboratories, Inc., Trevose, Pa.

[21] Appl. No.: 137,646

[22] Filed: Oct. 15, 1993

[51] Int. Cl.6 .......................... C07C 381/00
[52] U.S. Cl. ........................ 554/87; 554/85; 252/351; 252/352; 252/356
[58] Field of Search ............ 252/351, 352, 356, 8.552; 554/87, 85

[56] References Cited

U.S. PATENT DOCUMENTS 3,948,800  4/1976  Meenhardt .......................... 252/356
5,223,160  6/1993  Emmons ............................. 252/8.552

Primary Examiner—José G. Dees
Assistant Examiner—Deborah D. Carr
Attorney, Agent, or Firm—Alexander D. Ricci; Philip H. Von Neida

[57] ABSTRACT

Disclosed are methods for dispersing sulfur in aqueous systems comprising adding an alkylcarboxylic acid compound to the system. This prevents fouling of the aqueous system by the precipitated sulfur.

9 Claims, No Drawings

METHODS FOR DISPERSING SULFUR IN AQUEOUS SYSTEMS

FIELD OF THE INVENTION

The present invention provides for methods for dispersing sulfur to inhibit fouling in aqueous systems.

BACKGROUND OF THE INVENTION

In sour water strippers, ammonium sulfide is present as the predominant species. Ammonium sulfide can dissolve elemental sulfur, which could arise through oxidation reactions of the hydrogen sulfide. When hydrogen sulfide and ammonia are stripped off, the sulfur will come out of solution and yield a yellow precipitate which can foul the apparatus.

SUMMARY OF THE INVENTION

Alkylcarboxylic acids or their salts prove effective as sulfur dispersants in aqueous systems where sulfur can precipitate and foul system components.

DETAILED DESCRIPTION OF THE INVENTION

The present invention relates to methods for dispersing sulfur in an aqueous system comprising adding an effective amount for the purpose to said system an alkylcarboxylic acid or salt thereof.

The carboxylic acid is a mono-, di-, or tricarboxylic acid having from 8 to 60 carbon atoms. The ratio of total carbon atoms to acid groups is about 8:1 or greater.

Representative acids include 2-ethylhexanoic acid, octanoic acid, dodecanoic acid, stearic acid, oleic acid, linoleic acid, tall oil fatty acids, dimers and trimers of tall oil fatty acids and reaction products of linoleic acid and acrylic acid. One dicarboxylic acid of tall oil fatty acid has the formula $C_{21}H_{36}O_4$. The preferred carboxylic acids are those having 16 to 30 carbon atoms.

The total amount of alkylcarboxylic acid used in the methods of the present invention is that amount which is sufficient to disperse the sulfur present and will, of course, vary according to the conditions of the system. Preferably, the weight ratio of the alkylcarboxylic acid to sulfur present in the system ranges from about 2:1 to about 0.1:1. This ratio can include combinations of the designated acids.

The acid may be applied to the aqueous system neat or in a suitable solvent. One class of solvents include aromatic hydrocarbons such as heavy aromatic naphtha (HAN) or kerosene.

The acid may be applied to the aqueous system in amounts ranging from about 1 to about 10,000 parts acid per million parts aqueous system. Preferably, from about 5 to about 1000 parts per million are added to the aqueous system.

The aqueous systems treated generally are at temperatures of about 70° F. to about 212° F. (20° C.–100° C.).

The data set forth below illustrate this invention. These examples are only illustrations and should not be construed as limiting the scope thereof.

EXPERIMENTAL

The test method for evaluating sulfur dispersants consisted of heating an aqueous ammonium sulfide solution, in which a small amount of sulfur was dissolved with the appropriate treatment, to drive off the hydrogen sulfide and the ammonia leaving a yellow precipitate of sulfur. The results of this testing are shown in Table I.

TABLE I

| Carboxylic Acid | Carbons/ Acids | g treatment/ 0.5 g S | Precipitate |
| --- | --- | --- | --- |
| None | 0/0 | 0 | Yes[a] |
| Acetic | 2/1 | 1.0 | Yes |
| Butyric | 4/1 | 1.0 | Yes |
| 2-ethylhexanoic | 8/1 | 1.0 | No up to 2 Hrs. |
| Dodecanoic | 12/1 | 0.6 | No |
| Treatment A | 18/1 | 1.0 | No |
| Treatment A | 18/1 | 1.0 | Very little |
| Treatment A | 18/1 | 1.0[c] | Yes |
| Treatment B | 18/1 | 1.0[b] | No |
| Treatment B | 18/1 | 1.0 | No up to 8 Hrs. |
| Treatment B | 18/1 | 0.5 | No |
| Treatment B | 18/1 | 0.25 | Little |
| Treatment B (10%)[d] | 18/1 | 0.1 | No |
| Treatment B (10%)[d] | 18/1 | 0.1[c] | Very little |
| Treatment C | 21/2 | 1.0 | Little |
| Treatment C | 21/2 | 1.0[b] | No up to 1 Hr. |
| Treatment C (10%)[d] | 21/2 | 0.1 | No[a] |
| Treatment C & NaOH[e] | 21/2 | 1.0 | No |
| Treatment B (10%) & NaOH[e] | 18/1 | 0.1 | No[a] |
| NaOH[e] | 0/0 | 1.0 | Yes |

[a] replicated
[b] used 0.25 g S
[c] used 1.0 g S
[d] 10% represents a 10% solution of carboxylic acid
[e] ½ ml of 10% aqueous solution of NaOH
Treatment A = Emersol 315 is linoleic acid
Treatment B = Hystrene 3680 is an unsaturated polymerized fatty acid available from Witco
Treatment C = West Vaco 1550 is $C_{21}H_{36}O_4$ In a 250-ml beaker were added 50 ml of a 28% aqueous ammonium sulfide solution (as purchased from Aldrich Chemical), 50 ml of water, 0.5 g of sulfur which readily dissolved in the ammonium sulfide solution, and the appropriate treatment. The mixture was heated to about 100° C. with stirring for two hours at which time the appearance of the mixture was noted. The data appears in Table II.

TABLE II

| Compound | Treatment/ ul or g | PPT | Solution |
| --- | --- | --- | --- |
| Blank | — | yellow | clear |
| Blank | — | yellow | clear |
| Blank | — | yellow | clear |
| Dodecanoic acid | 0.57 g | none | milky |
| Treatment A | 1000 | none | milky |
| 2-ethylhexanoic acid | 1000 | none | milky; after 2 hr. clear soln, yel PPT |
| Treatment B (10%)[d] & 0.5 NaOH[e] | 1000/1000 | none | milky |
| Treatment B (10%)[d] & 0.5 NaOH[e] | 1000/1000 | none | milky |
| Treatment B (10%)[d] | 1000 | none | milky |
| Treatment B (10%)[d] & 0.5 NaOH[e] | 1000/1000 | none | milky |
| Treatment B | 1000 | none | milky |
| Treatment B | 1000 | none | milky at least 8 hrs. before PPT |
| Treatment B | 500 | none | milky |
| Treatment B | 250 | little | milky |
| Treatment C | 1000 | little | milky |
| Treatment C | 1000 | little | milky |
| Treatment C & 0.5 NaOH[e] | 1000/1000 | none | milky |
| Treatment C (10%)[d] | 1000 | none | milky |

TABLE II-continued

| Compound | Treatment/ ul or g | PPT | Solution |
|---|---|---|---|
| Treatment C (10%)[d] | 1000 | none | milky |

[d] 10% represents a 10% solution of carboxylic acid
[e] ½ ml of 10% aqueous solution of NaOH
Treatment A = Emersol 315 is linoleic acid
Treatment B = Hystrene 3680 is an unsaturated polymerized fatty acid available from Witco
Treatment C = West Vaco 1550 is $C_{21}H_{36}O_4$ To 90 ml of water and 10 ml of 28% ammonium sulfide solution (as purchased from Aldrich Chemical) was added sulfur which dissolved and the designated amount of dispersant. This mixture was heated at about 100° C. for 2 hours and the result observed. The data is presented in Table III.

TABLE III

| Compound | g S | ul Treatment | PPT | Soln. |
|---|---|---|---|---|
| Treatment A | 1.0 | 1000 | yellow | milky |
| Treatment A | 0.5 | 1000 | very little yellow | milky |
| Treatment B | 1.0 | 1000 | very little yellow | milky |

Treatment A = Emersol 315 is linoleic acid
Treatment B = Hystrene 3680 is an unsaturated polymerized fatty acid available from Witco Tables II and III demonstrate that long chained alkylcarboxylic acids suspend sulfur coming out of solution after the ammonia and hydrogen sulfide were removed.

To 100 ml of water was added 0.5 g sulfur which never dissolved and the designated amount of dispersant. This mixture was heated at about 100° C. for 2 hours and the result observed. The data is presented in Table IV.

TABLE IV

| Compound | ul Treatment | PPT | Soln. |
|---|---|---|---|
| Blank | 0 | yellow | clear |
| Treatment A | 2000 | yellow | clear |
| Treatment B | 1000 | light green | milky |
| Treatment C | 1000 | none | milky |

Treatment A = Emersol 315 is linoleic acid
Treatment B = Hystrene 4W is an unsaturated polymerized fatty acid available from Witco
Treatment C = West Vaco 1550 is $C_{21}H_{36}O_4$ To 100 ml of water was added 0.5 g sulfur which never dissolved and the treatment. This solution was heated at about 100° C. for 1.5 hours and then dosed with 2.5 ml of 28% ammonium sulfide solution from Aldrich and stirred for another 30 minutes. The data is shown in Table V.

TABLE V

| Compound | ul Treatment | PPT | Soln. |
|---|---|---|---|
| Blank | 0 | yellow | yellow |
| Treatment A | 1000 | little yellow | orange |
| Treatment B | 1000 | little | milky green |
| Treatment C | 1000 | little | milky |

Treatment A = Emersol 315 is linoleic acid
Treatment B = Hystrene 4W is an unsaturated polymerized fatty acid available from Witco
Treatment C = West Vaco 1550 is $C_{21}H_{36}O_4$ While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for dispersing sulfur in an aqueous system comprising adding an effective amount for the purpose to said system an alkylcarboxylic acid or salt thereof wherein said alkylcarboxylic acid has from 8 to 60 carbon atoms.

2. The method as claimed in claim 1 wherein said alkylcarboxylic acid has a ratio of total carbon atoms to acid groups of about 8:1.

3. The method as claimed in claim 1 wherein said alkylcarboxylic acid is linoleic acid.

4. The method as claimed in claim 1 wherein said alkylcarboxylic acid is 2-ethylhexanoic acid.

5. The method as claimed in claim 1 wherein said alkyl carboxylic acid is dodecanoic acid.

6. The method as claimed in claim 1 wherein said alkylcarboxylic acid is an unsaturated polymerized fatty acid.

7. The method as claimed in claim 1 wherein said alkylcarboxylic acid has the formula $C_{21}H_{36}O_4$.

8. The method as claimed in claim 1 wherein said alkyl carboxylic acid is added to said system in a weight ratio of about 2:1 to about 0.1:1 alkylcarboxylic acid:sulfur.

9. The method as claimed in claim 1 wherein said alkylcarboxylic acid is added to said system in an aromatic hydrocarbon solvent.

* * * * *